(12) United States Patent
Mozhdehi et al.

(10) Patent No.: US 12,067,313 B1
(45) Date of Patent: Aug. 20, 2024

(54) MACHINE LEARNING-BASED SYSTEMS AND METHODS FOR AUTOMATICALLY DETERMINING CHARACTERISTICS OF PRINTED LABELS

(71) Applicant: Brady Worldwide, Inc., Milwaukee, WI (US)

(72) Inventors: Reza Jalil Mozhdehi, Milwaukee, WI (US); Dustin M. Stumpf, Pewaukee, WI (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 0 days.

(21) Appl. No.: 18/448,350

(22) Filed: Aug. 11, 2023

(51) Int. Cl.
*G06F 3/12* (2006.01)
*G06V 10/40* (2022.01)
*G06V 10/70* (2022.01)

(52) U.S. Cl.
CPC .......... *G06F 3/1243* (2013.01); *G06F 3/1204* (2013.01); *G06V 10/40* (2022.01); *G06V 10/70* (2022.01)

(58) Field of Classification Search
USPC ........................................................ 358/1.6
See application file for complete search history.

(56) References Cited

U.S. PATENT DOCUMENTS

| 2015/0049918 A1* | 2/2015 | Fan | H04Q 1/136 |
| | | | 382/108 |
| 2018/0307449 A1* | 10/2018 | Tsuji | G06K 15/022 |
| 2022/0172453 A1* | 6/2022 | Sakurai | G06T 7/0002 |

FOREIGN PATENT DOCUMENTS

| CN | 116552135 A | 8/2023 |
| WO | 2022/238032 A1 | 11/2022 |

OTHER PUBLICATIONS

Ravi Bandakkanavar; "The Role of Artificial Intelligence in Label Printing" dated Jun. 22, 2023; https://krazytech.com/technical-papers/artificial-intelligence-in-label-printing[Aug. 15, 2023 12:09:17 PM].

* cited by examiner

*Primary Examiner* — Jacky X Zheng
(74) *Attorney, Agent, or Firm* — Thomas M. Hardman

(57) ABSTRACT

Aspects of the present disclosure simplify label printing for an object that includes a plurality of features, such as a patch panel that includes a plurality of ports. When a user wants to print a label for a group within an object (e.g., a group of ports within a patch panel), an image can be captured of at least one feature within the group. The image can be processed by a machine learning model (MLM) that has been trained to detect the presence of such features in captured images and to determine location information indicating where the features are located in the captured images. The label printing module can automatically determine characteristic(s) of the printed label (e.g., the length of the printed label, markings on the printed label) based at least in part on the location information determined by the MLM.

20 Claims, 10 Drawing Sheets

MACHINE LEARNING-BASED SYSTEMS AND METHODS FOR AUTOMATICALLY DETERMINING CHARACTERISTICS OF PRINTED LABELS

BACKGROUND

The present disclosure is generally related to the printing of labels that are designed to be affixed to objects having a plurality of features. As one specific example, the techniques disclosed herein can be applied to the printing of labels that are designed to be affixed to patch panels.

A patch panel is a device used in telecommunications and computer networking to facilitate the organization and management of multiple cables in a computer system. It acts as a central point where cables from various sources (such as computers, switches, and routers) can be terminated and interconnected. A patch panel provides a convenient and structured way to make changes, additions, or repairs to network connections without disrupting the entire system.

Patch panels come in various shapes, sizes, and orientations to suit different networking requirements. Thus, the features and characteristics of patch panels are highly variable. For example, patch panels vary in the number of ports they have. Some patch panels have only a few ports (e.g., fewer than ten ports), while other patch panels have a relatively large number of ports (e.g., several hundred ports). The distance between adjacent ports can also vary, with some patch panels having tightly spaced ports and other patch panels having ports that are spaced farther apart. The orientation of the ports can vary as well, with some patch panels featuring ports aligned vertically in one or more columns, while others have ports arranged horizontally in one or more rows. Additionally, the ports on a patch panel can be arranged into different groups, and the number of groups of ports can vary across different patch panels.

It is typically desirable for the ports on a patch panel to be labeled, thereby allowing for easy identification and organization of the connected cables. Labels can be created by a printing device. The printing device can be communicatively coupled to a computing device, and the computing device can include software (e.g., a label printing program) that enables a user of the computing device to control various aspects of the printing device.

Currently available label printing software for patch panels requires a user to input certain information. For example, if a label is being printed for a group of ports on a patch panel, the user may be required to input the number of ports in the group, the orientation of the ports (e.g., horizontal or vertical), and the distance between adjacent ports. Some of the required information may be difficult to determine. For example, because the spacing between ports varies among different patch panels, the user may not know offhand what the distance is between adjacent ports. In this case, the user could be required to use a ruler to manually measure the distance between ports. This could be inconvenient for several reasons. For example, not all users will have immediate access to a ruler or other measuring tools. In addition, the process of manually measuring distances introduces the potential for error, as even small inaccuracies in measurement can lead to labels not aligning correctly with the ports.

Accordingly, benefits may be realized by improvements to software for printing labels for objects, such as patch panels, that have variable features.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to simplifying label printing for an object that includes a plurality of features. As a non-limiting example, the techniques disclosed herein can be applied to printing labels for a patch panel that includes a plurality of ports. However, those skilled in the art will recognize that the techniques disclosed herein can be applied to printing labels for other types of objects.

Aspects of the present disclosure can be implemented in a computing device that includes a camera and label printing software. The label printing software can be configured to automatically determine characteristic(s) of a printed label for an object, such as a patch panel, based on image(s) of the object. The label printing software can also be configured to create a print job that causes a printing device to produce the printed label having the desired characteristic(s).

In some embodiments, when a user wants to print a label for a group of features within an object (e.g., a group of ports on a patch panel), the user can position the computing device so that at least two adjacent features in the group of features (e.g., two adjacent ports in the group of ports) are visible in the camera's field of view. Then, by providing input to the computing device, the user can cause an image of the two adjacent features to be captured by the camera.

The image can be provided to a machine learning model (MLM) that has been trained to detect the presence of the features in captured images and to determine location information indicating where the features are located in captured images. Such an MLM may be referred to herein as a feature detection MLM. The label printing software can determine at least one characteristic for a printed label that will be affixed near the group of features on the object based at least in part on the location information determined by the feature detection MLM. Advantageously, the characteristic(s) of the printed label can be determined automatically, without requiring additional user input.

For example, the label printing software can determine the length of the printed label based at least in part on the location information determined by the feature detection MLM. In some embodiments, the label printing software can use the location information determined by the feature detection MLM to determine the distance between two adjacent features within the object (e.g., the distance between two adjacent ports within the patch panel). Advantageously, the distance between two adjacent features within the object can be determined automatically, without requiring the user to perform any measurements. The distance between two adjacent features within the object can then be used to determine the desired length of the printed label.

As another example, the label printing software can automatically determine the placement of markings on the printed label based at least in part on the location information determined by the feature detection MLM. The markings can indicate boundaries between adjacent features within the object (e.g., boundaries between adjacent ports within the group of ports in the patch panel). The location information determined by the feature detection MLM can also be used to determine other information, such as the orientation (e.g., horizontal or vertical) of the features within the object.

Once characteristic(s) for a printed label that will be affixed near the group of features within the object have been determined, then the label printing software can create a print job that causes a printing device to produce the printed label. The print job can then be sent to the printing device.

As one non-limiting example, the techniques disclosed herein can be useful to information technology (IT) personnel who are labeling patch panels in connection with managing computer system(s) for an enterprise. Such personnel may utilize mobile computing devices (e.g., smartphones, tablet computers, laptop computers) for labeling patch panels. Also, an IT professional labeling patch panels might not have access to the internet due to various reasons. In this situation, it can be useful for the feature detection MLM to run locally on a mobile computing device (as opposed to running in the cloud). However, mobile computing devices may not have sufficient processing and memory resources for executing a large MLM. To address this potential issue, the feature detection MLM that runs on the mobile computing device can be a compressed version of a larger feature detection MLM.

In some embodiments, an object can include a plurality of groups of features, and the label printing software can be used to automatically print a distinct label for each group. To facilitate this, an image that includes all of the features within the object can be captured, and this image can then be used to determine the number of groups of features in the object. In one possible embodiment, the image can be processed by the feature detection MLM in the same manner as was discussed above (e.g., the feature detection MLM can detect the presence of the features in the image), and then a clustering algorithm can be executed on the output of the feature detection MLM. In another possible embodiment, the image can be processed by another MLM that has been trained to detect groups of features. Once the number of groups of features in the object has been determined, the label printing software can then be used to create a plurality of print jobs (e.g., a distinct print job for each distinct group of features) that cause the printing device to produce a plurality of printed labels. The output of the feature detection MLM can be used to determine characteristic(s) of each printed label, in the manner described above.

In some embodiments, a system that is configured to print one or more labels for an object that comprises a plurality of features is provided. The system includes a camera, a processor, memory communicatively coupled to the processor, and a label printing module that is stored in the memory. The label printing model is executable by the processor to cause the camera to capture an image that includes at least two adjacent features within the object. The label printing model is additionally executable by the processor to provide the image to a feature detection machine learning model (MLM) that has been trained to detect features of the object in images and to determine location information indicating where the detected features are located in the images. The label printing model is additionally executable by the processor to determine at least one characteristic for a printed label corresponding to a group of features within the object, wherein determining the at least one characteristic is based at least in part on the location information determined by the feature detection MLM. The label printing model is additionally executable by the processor to create a print job that causes a printing device to produce the printed label having the at least one characteristic and send the print job to the printing system.

In some embodiments, a method for printing a label for a group of features in an object is provided. The method includes causing a camera to capture an image that includes at least two adjacent features within the group of features. The method also includes providing the image to a feature detection machine learning model (MLM) that has been trained to detect features of the object in images and to determine location information indicating where the detected features are located in the images. The method also includes determining at least one characteristic for the label based at least in part on the location information determined by the feature detection MLM. The method also includes creating a print job that causes a printing device to produce the label having the at least one characteristic and sending the print job to the printing device.

In some embodiments, a non-transitory computer-readable medium comprising instructions that are executable by at least one processor to cause a computing device to implement a method for printing a label for a group of features in an object is provided. The method includes causing a camera to capture an image that includes at least two adjacent features within a group of features in an object. The method also includes providing the image to a feature detection machine learning model (MLM) that has been trained to detect features of the object in images and to determine location information indicating where the detected features are located in the images. The method also includes determining at least one characteristic for a printed label that is designed to be affixed to the object, wherein determining the at least one characteristic is based at least in part on the location information determined by the feature detection MLM. The method also includes creating a print job that causes a printing device to produce the printed label having the at least one characteristic and sending the print job to the printing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
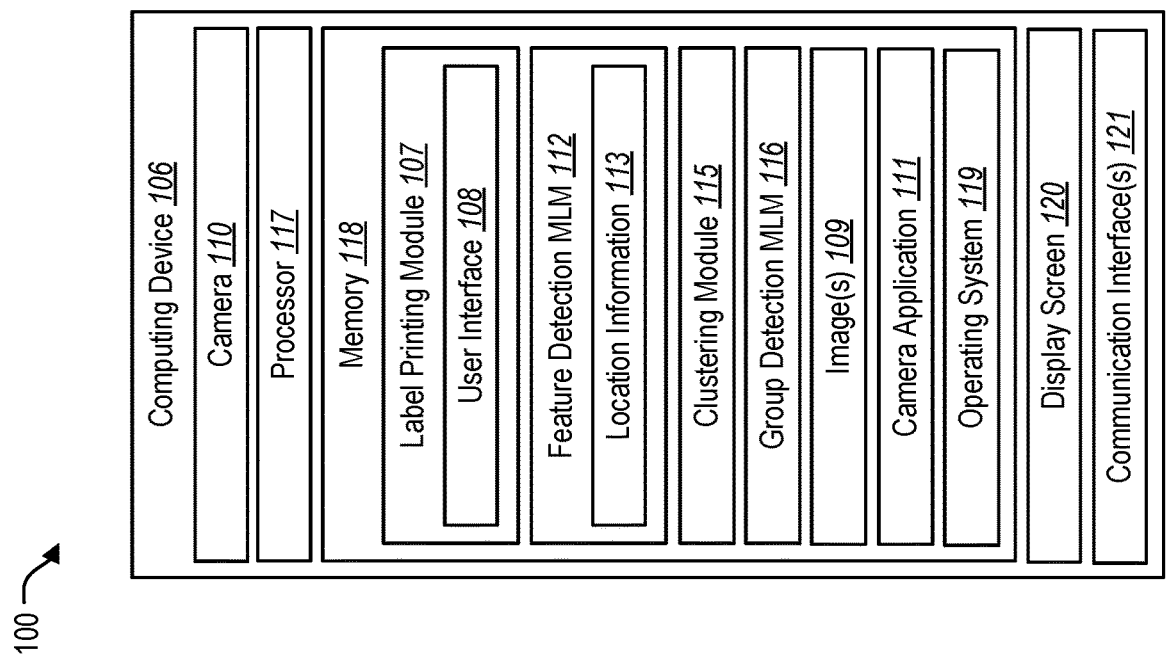
FIG. 1 illustrates an example of a system in which the techniques disclosed herein can be utilized, the system including a label printing module that is configured to automatically determine characteristic(s) of a printed label for an object based on image(s) of at least a portion of the object.

FIG. 1 illustrates an example of a system 100 in which the techniques disclosed herein can be utilized. The system 100 includes an object 101 that includes a plurality of features 102. As a non-limiting example, the object 101 can be a patch panel that includes a plurality of ports. The system 100 also includes a printing device 103 that is configured to print one or more labels 104 that can be affixed to the object 101.

In some embodiments, the features 102 in the object 101 can be organized into a plurality of groups 105, and a separate label 104 can be printed for each group 105. For example, if the object 101 is a patch panel, the ports within the patch panel can be organized into a plurality of groups of ports, and a separate label 104 can be printed for each group of ports.

The system 100 also includes a computing device 106 that is communicatively coupled to the printing device 103. The computing device 106 includes a label printing module 107 that enables a user of the computing device 106 to control various aspects of the printing device 103.

The label printing module 107 can be configured to automatically determine characteristic(s) of a printed label 104 for the object 101 based on one or more images 109 of the object 101 (or portions of the object 101). The image(s) 109 can be captured by a camera 110. As shown in FIG. 1, the camera 110 can be part of the computing device 106 on which the label printing module 107 is running. In an alternative embodiment, the camera 110 can be distinct from, and communicatively coupled to, the computing device 106. In embodiments where the camera 110 is included as part of the computing device 106, the computing device 106 can also include a camera application 111 that controls the operation of the camera 110.

In accordance with the present disclosure, image(s) 109 of the object 101 (and/or image(s) 109 of portions of the object 101) can be processed using machine learning techniques. Machine learning is a type of artificial intelligence that involves teaching computers to learn from data without being explicitly programmed to do so. The machine learning process produces a machine learning model, which is an algorithm that has been trained on a dataset to make predictions or decisions about new data based on patterns and trends found in the training dataset. The performance of a machine learning model can improve over time as the machine learning model is exposed to additional data.

In the system 100 depicted in FIG. 1, the computing device 106 includes a feature detection machine learning model (MLM) 112. The feature detection MLM 112 has been trained to process an image 109 of the object 101 (or an image 109 of a portion of the object 101) in order to detect certain feature(s) 102 of the object 101 in the image 109 and determine location information 113 indicating where the feature(s) 102 are located in the image 109. The label printing module 107 can use the location information 113 to determine at least one characteristic for a printed label 104 that is designed to be affixed to the object 101.

For example, if the object 101 is a patch panel, the feature detection MLM 112 can process an image 109 of at least two adjacent ports in the patch panel. The feature detection MLM 112 can detect the two adjacent ports in the image 109 and determine location information 113 indicating where the two adjacent ports are located in the image 109. This location information 113 can then be used to determine additional information, such as the distance between the two adjacent ports and/or the orientation (e.g., horizontal or vertical) of the two adjacent ports. This additional information can then be used to determine characteristic(s) of the printed label 104. As a non-limiting example, the label printing module 107 can use the distance between the two adjacent ports (along with other information, such as the number of ports in the group of ports for which the label 104 is being printed) to determine the desired length of the printed label 104. As another non-limiting example, the label printing module 107 can use the distance between the two adjacent ports to determine the placement of markings on the printed label 104, where the markings indicate boundaries between adjacent ports in the patch panel.

The techniques disclosed herein can be utilized to determine a wide variety of characteristics for a printed label 104. In this context, the term "characteristic" can refer to any identifiable feature or quality that distinguishes a specific printed label 104. The characteristics of a printed label 104 can be physical and/or related to the content and design of the label 104. Some examples of characteristics of a printed label 104 include the size of the label 104 (e.g., length and/or width), the shape of the printed label 104, the text and/or other markings that appear on the printed label 104, the color of the printed label 104, other aspects of the appearance of the printed label 104, and so forth.

Once the desired characteristic(s) of the printed label 104 have been determined, the label printing module 107 can create a print job 114 that causes the printing device 103 to produce the printed label 104 having the desired characteristic(s). The label printing module 107 can send the print job 114 to the printing device 103, and the printing device 103 can process the print job 114 in order to create the printed label 104.

In some embodiments, the computing device 106 that communicates with the printing device 103 can be a mobile computing device. A mobile computing device can be a portable computing device that is designed to be transported from place to place and used in a variety of different locations. Examples of mobile computing devices include smartphones, tablet computers, laptop computers, and so forth.

In some embodiments, the label printing module 107 and the feature detection MLM 112 may be utilized on a mobile computing device that does not have access to the internet. As mentioned above, the techniques disclosed herein can be useful to information technology (IT) personnel who are labeling patch panels in connection with managing computer system(s) for an enterprise. An IT professional labeling patch panels might not have access to the internet due to various reasons. For example, they could be working in a remote site or a new building where internet services have not yet been installed or activated. As another example, for security purposes, the IT infrastructure being managed might be isolated from the internet to prevent cyber-attacks.

Mobile computing devices may not have sufficient processing and memory resources for executing a large MLM. To address this potential issue, the feature detection MLM 112 that runs on a mobile computing device can be a compressed version of a larger feature detection MLM. In some embodiments, commercially available software such as TensorFlow Lite can be used to compress a larger feature detection MLM into a compressed feature detection MLM 112 that can run on a mobile computing device.

Training the feature detection MLM 112 can involve the use of a large dataset of images 109 of objects 101 (e.g., patch panels), both with and without the features 102 (e.g., ports) that should be identified. This dataset can serve as the basis for teaching the feature detection MLM 112 what the feature 102 of interest looks like in various settings, angles, lighting conditions, etc. To effectively train the feature detection MLM 112, each image 109 in the dataset can be labeled with information about where the feature 102 of interest appears in the image 109. For example, bounding boxes can be drawn around the feature 102, and the feature 102 can be associated with a label (e.g., "port"). Once the annotated dataset is ready, it can be divided into a training set, a validation set, and a test set. The training set can be used to adjust the parameters of the feature detection MLM 112. The validation set can be used to tune hyperparameters and prevent overfitting. The test set can be used to assess the performance of the feature detection MLM 112.

As noted above, the features 102 in the object 101 can be organized into a plurality of groups 105 (e.g., a plurality of groups of ports within a patch panel). In some embodiments, the label printing module 107 can be configured to automatically determine the number of groups 105 in the object 101 and to automatically create a separate print job 114 for each group 105.

There are several different ways that the number of groups 105 in the object 101 can be determined. As a non-limiting example, an image 109 that includes all of the groups 105 can be captured and processed by the feature detection MLM 112, and then a clustering algorithm can be executed on the output of the feature detection MLM 112. The computing device 106 is shown with a clustering module 115 for providing this functionality. As another non-limiting example, an image 109 that includes all of the groups 105 can be provided to a machine learning model that has been trained to detect groups 105. The computing device 106 is shown with a group detection machine learning model (MLM) 116 for providing this functionality.

In some embodiments, some or all of the machine learning models disclosed herein (e.g., the feature detection MLM 112 and/or the group detection MLM 116) can be implemented using deep learning techniques. Deep learning is a subfield of artificial intelligence and machine learning that focuses on algorithms called artificial neural networks. Deep learning models can be constructed using multiple layers of these neural networks. These models have been widely applied in fields that involve large amounts of high-dimensional data, such as object detection. Deep learning models can often outperform traditional machine learning models on these tasks due to their ability to automatically extract useful features from raw data and capture complex patterns.

The label printing module 107 includes a user interface 108 that enables a user of the computing device 106 to control and interact with the label printing module 107. The user interface 108 includes a plurality of user interface elements (e.g., buttons, icons, menus, screens, touch commands) that make the functions performed by the label printing module 107 accessible to users. Certain aspects of one possible implementation of the user interface 108 will be described below.

The computing device 106 includes at least one processor 117 and memory 118 communicatively coupled to the processor(s) 117. The label printing module 107, feature detection MLM 112, clustering module 115, and group detection MLM 116 include instructions that are stored in the memory 118 and executable by the processor(s) 117 to perform the operations that are described herein in relation to those components.

FIG. 1 shows the label printing module 107, the feature detection MLM 112, the clustering module 115, and the group detection MLM 116 as being separate components. In an alternative embodiment, some or all of these software components can be combined within the same software component. As a non-limiting example, the feature detection MLM 112, clustering module 115, and/or group detection MLM 116 can be included within the label printing module 107.

The computing device 106 also includes an operating system 119, a display screen 120, and at least one communication interface 121. The communication interface(s) 121 enable the computing device 106 to communicate with the printing device 103 and with other computing and/or electronic devices as well.

The printing device 103 includes a printing mechanism 122 that is configured to make a persistent representation of text, graphics, or other indicia on a substrate, such as an unprinted label. There are a variety of different printing technologies that the printing mechanism 122 can be configured to utilize. In some embodiments, the printing mechanism 122 can be configured to utilize thermal printing technology by selectively heating regions of a heat-sensitive substrate. Alternatively, the printing mechanism 122 can be configured to utilize another type of printing technology, such as dye sublimation, laser printing, inkjet printing, or the like.

Figure 2A:
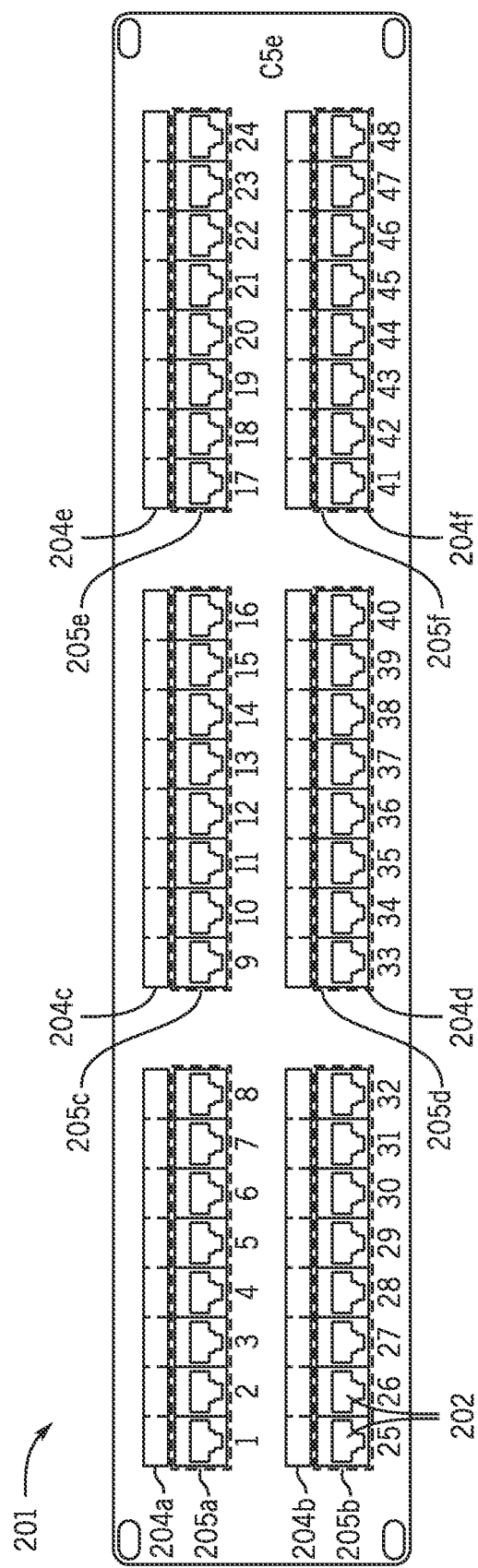
FIG. 2A illustrates an example of a patch panel.

FIG. 2A illustrates an example of a patch panel 201. The patch panel 201 includes a plurality of ports 202. The patch panel 201 is an example of the object 101 in the system 100 shown in FIG. 1. The ports 202 within the patch panel 201 are examples of the features 102 in the object 101 in the system 100 shown in FIG. 1.

The patch panel 201 has a horizontal orientation. In other words, the patch panel 201 is designed to be mounted to a surface such that the longest side of the patch panel 201 is substantially horizontal (or, in other words, substantially parallel to the ground) from the perspective of someone who is interacting with the patch panel 201.

The ports 202 within the patch panel 201 are organized into a plurality of different groups 205a-f. The groups 205a-f each include a row of ports 202 having a horizontal orientation. The groups 205a-f are examples of the groups 105 within the object 101 in the system 100 shown in FIG. 1.

A plurality of printed labels 204a-f are affixed to the patch panel 201, such that a separate printed label is affixed to the patch panel 201 above each group of ports. Thus, printed label 204a is affixed to the patch panel 201 above group 205a, printed label 204b is affixed to the patch panel 201 above group 205b, and so forth.

Figure 2B:
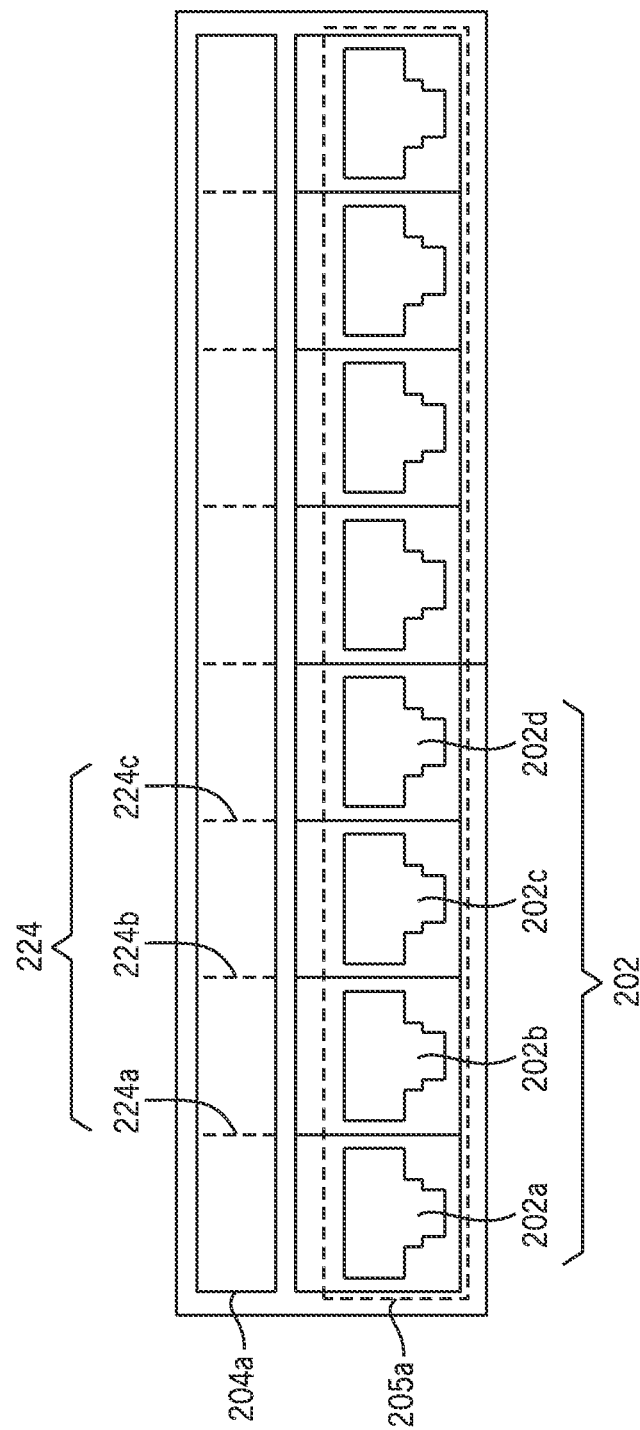
FIG. 2B illustrates one of the groups of ports in the patch panel shown in FIG. 2A.

FIG. 2B illustrates the group 205a of ports 202 in the patch panel 201 shown in FIG. 2A. The printed label 204a that is affixed to the patch panel 201 above this group 205a is also shown. The other printed labels 204b-f in the patch panel 201 shown in FIG. 2A have similar characteristics to the printed label 204a shown in FIG. 2B. In other words, the printed label 204a shown in FIG. 2B can be considered to be representative of all of the other printed labels 204b-f on the patch panel 201.

The length of the printed label 204a (measured horizontally) is substantially similar to the length of the group 205a. In addition, the printed label 204a has a plurality of markings 224 provided thereon. These markings 224 indicate boundaries between adjacent ports 202. For example, marking 224a indicates a boundary between port 202a and port 202b, marking 224b indicates a boundary between port 202b and port 202c, marking 224c indicates a boundary between port 202c and port 202d, and so on.

In the depicted embodiment, the markings 224 include vertical lines with dashes. However, those skilled in the art will recognize that other types of markings can be used in alternative embodiments. As a non-limiting example, solid lines or dotted lines could be used in place of dashed lines. As another non-limiting example, different colors, shading patterns, and/or hatching patterns could indicate different ports 202. Those skilled in the art will recognize many other types of markings that could be used.

Figure 3:
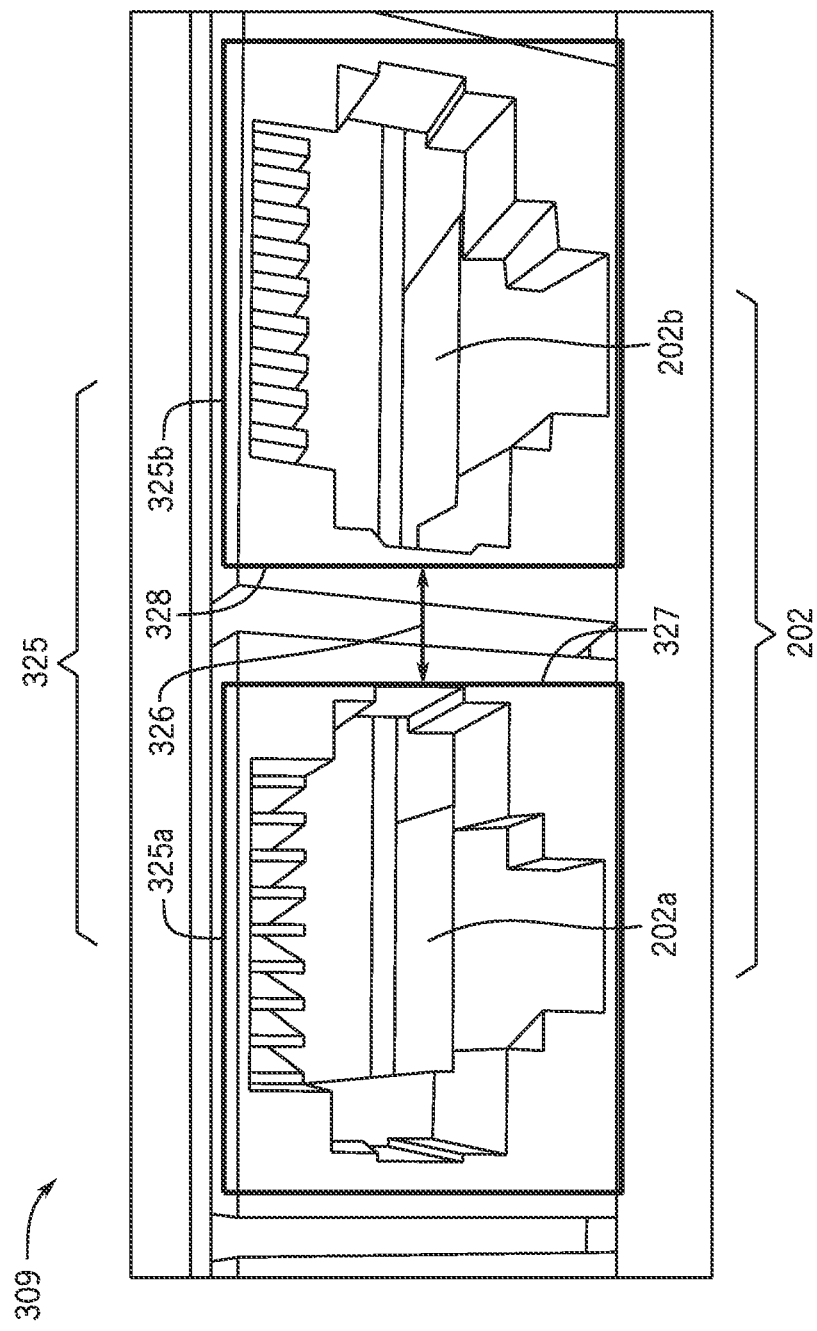
FIG. 3 illustrates an example of an image of two adjacent ports in the group of ports shown in FIG. 2B.

FIG. 3 illustrates an example of an image 309 of two adjacent ports 202a-b in the patch panel 201. For purposes of the present example, it will be assumed that the image 309 has been processed by the feature detection MLM 112 and that the feature detection MLM 112 has detected the ports 202a-b in the image 309. The image 309 includes bounding boxes 325 that define where in the image 309 the detected ports 202a-b are located. More specifically, the image 309 includes a first bounding box 325a drawn around the first port 202a and a second bounding box 325b drawn around the second port 202b.

In some embodiments, the location information 113 determined by the feature detection MLM 112 includes the coordinates for the bounding boxes 325. As a non-limiting example, the location information 113 determined by the feature detection MLM 112 for a port 202a that has been detected within an image 309 can include the (x, y) coordinates for two opposite corners (e.g., the top-left and bottom-right corners) within a bounding box 325a that defines the location of the port 202a within the image 309. As another non-limiting example, the location information 113 determined by the feature detection MLM 112 for a port 202a that has been detected within an image 309 can include the (x, y) coordinates for one of the corners (e.g., the top-left corner) within a bounding box 325a that defines the location of the port 202a within the image 309, as well as the size (width, height) of the bounding box 325a.

The arrow 326 in FIG. 3 represents the distance between the ports 202a-b in the image 309. In some embodiments, this value can be determined by calculating the distance between the bounding boxes 325a-b. For example, the distance between the ports 202a-b in the image 309 can be determined by calculating the horizontal distance (i.e., the distance in the x-direction in an x-y coordinate system) between the right side 327 of the first bounding box 325a and the left side 328 of the second bounding box 325b.

Although bounding boxes 325a-b are shown in the depicted example, the scope of the present disclosure should not be limited in this regard. In alternative embodiments, the feature detection MLM 112 can be trained to perform segmentation. In general terms, "segmentation" is a process used to partition an image into multiple segments or regions. At least some of the segments or regions can include a feature 102 of interest. In some embodiments, the location information 113 can identify specific segments or regions of the image that include the feature 102 of interest (e.g., ports 202a-b). In some embodiments, such segments or regions of the image can be specified on a per-pixel basis.

Figure 4A:
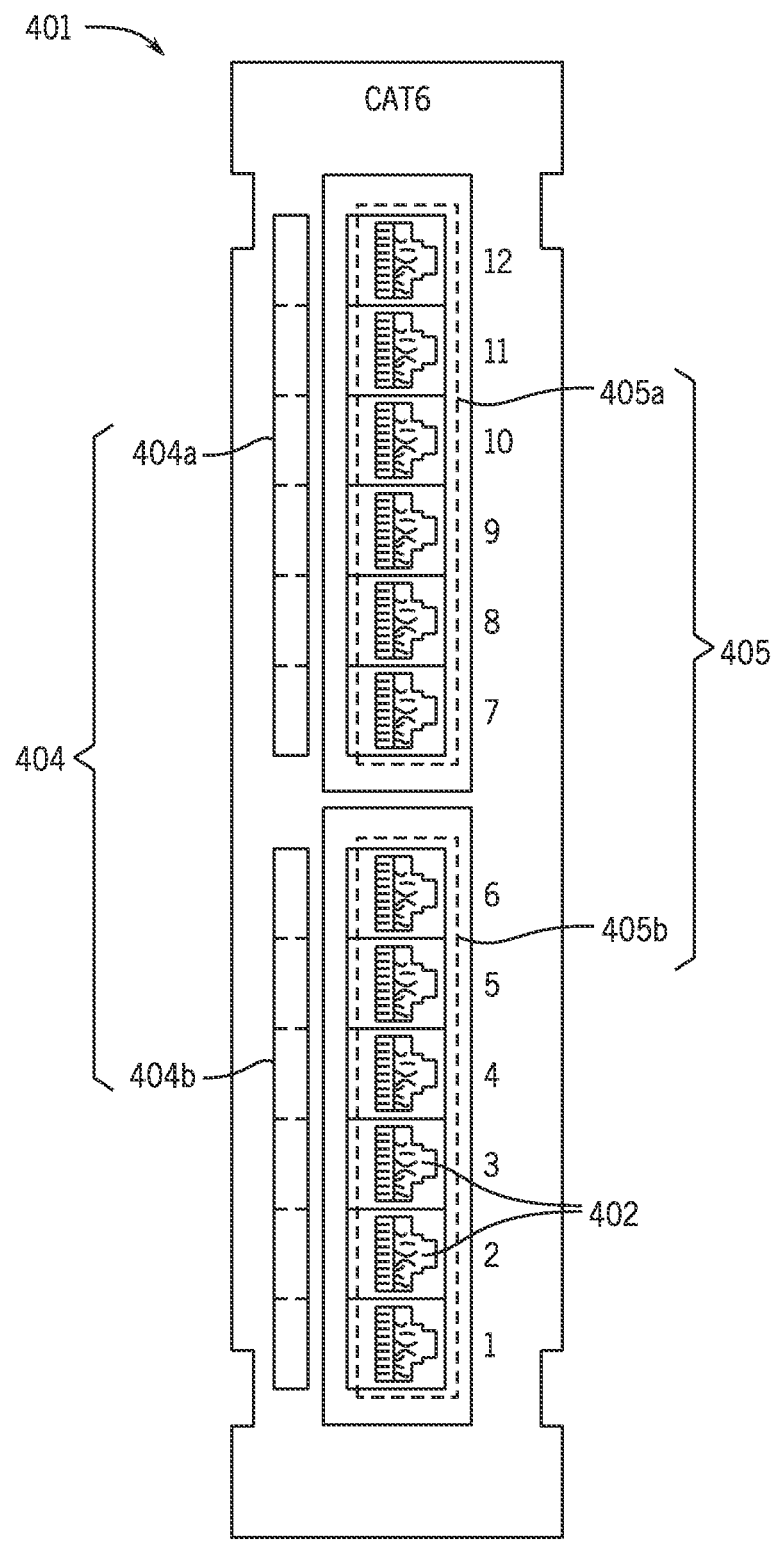
FIG. 4A illustrates another example of a patch panel.

FIG. 4A illustrates another example of a patch panel 401. The patch panel 401 is similar in many respects to the patch panel 201 shown in FIG. 2A. For example, the patch panel 401 includes a plurality of ports 402, and the ports 402 within the patch panel 401 are organized into a plurality of groups 405a-b. However, unlike the patch panel 201 described previously, the patch panel 401 shown in FIG. 4 has a vertical orientation. In other words, the patch panel 401 is designed to be mounted to a surface such that the longest side of the patch panel 401 is substantially perpendicular to the ground from the perspective of someone who is interacting with the patch panel 401. The groups 405a-b each include a row of ports 402 having a vertical orientation.

As with the patch panel 201 described previously, a plurality of printed labels 404a-b are affixed to the patch panel 401. However, with the patch panel 401 shown in FIG. 4A, a separate printed label 404 is affixed to the patch panel 401 to the side of each group of ports 405. In particular, printed label 404a is affixed to the patch panel 401 to the side of group 405a, and printed label 404b is affixed to the patch panel 401 to the side of group 405b.

Figure 4B:
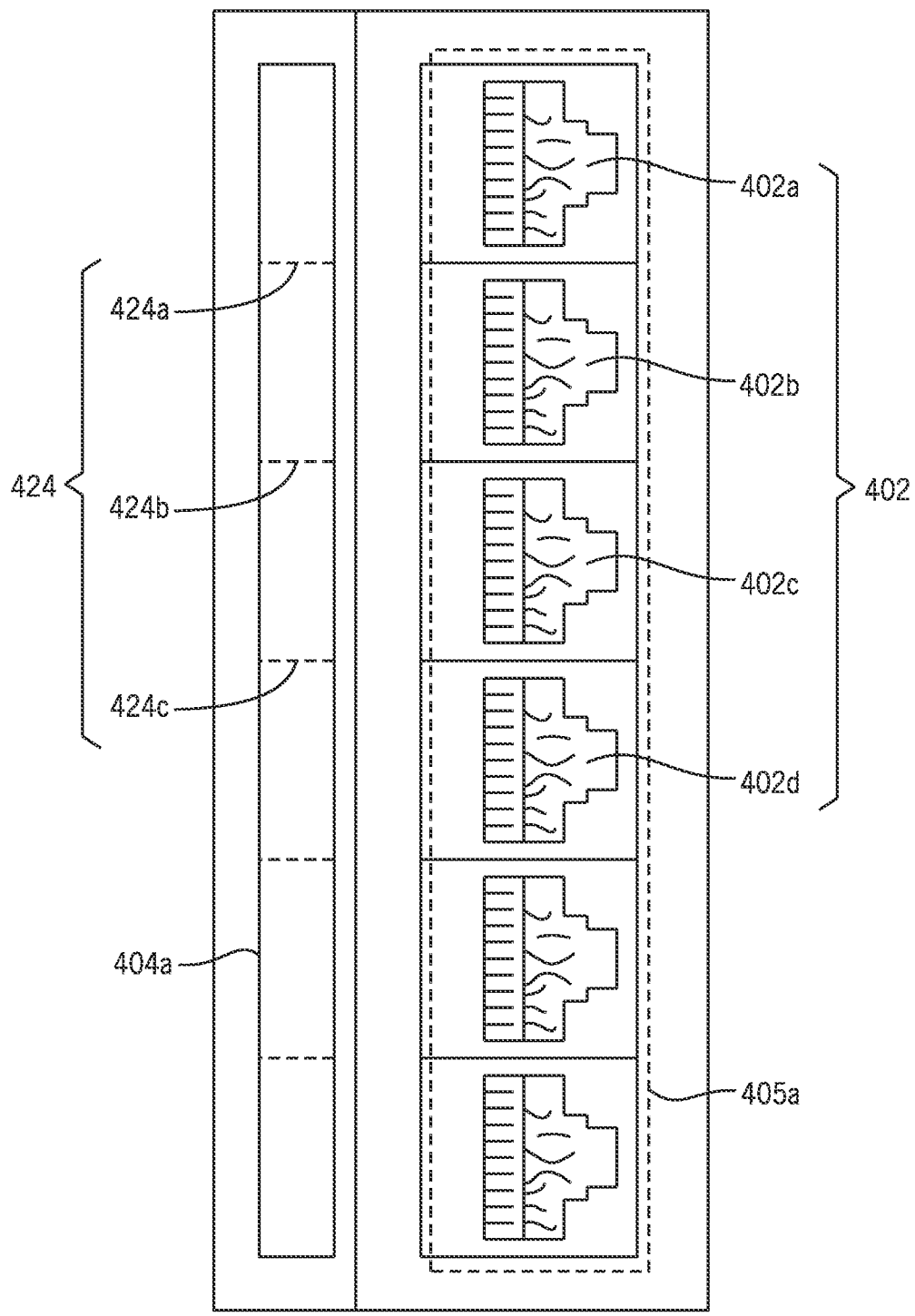
FIG. 4B illustrates one of the groups of ports in the patch panel shown in FIG. 4A.

FIG. 4B illustrates the group 405a in the patch panel 401 shown in FIG. 4A. The printed label 404a that is affixed to the patch panel 401 to the side of this group 405a is also shown. For purposes of the present example, it can be assumed that the other printed label 404b in the patch panel 401 shown in FIG. 4A has similar characteristics to the printed label 404a shown in FIG. 4B.

The length of the printed label 404a (measured vertically) is substantially the same as the length of the group 405a. As with the printed labels 204a-f described previously, the printed label 404a has a plurality of markings 424 provided thereon indicating boundaries between adjacent ports 402. For example, marking 424a indicates a boundary between port 402a and port 402b, marking 424b indicates a boundary between port 402b and port 402c, marking 424c indicates a boundary between port 402c and port 402d, and so on. In the depicted embodiment, the markings 424 include horizontal lines with dashes. However, as discussed above, those skilled in the art will recognize that other types of markings can be used in alternative embodiments.

Figure 5:
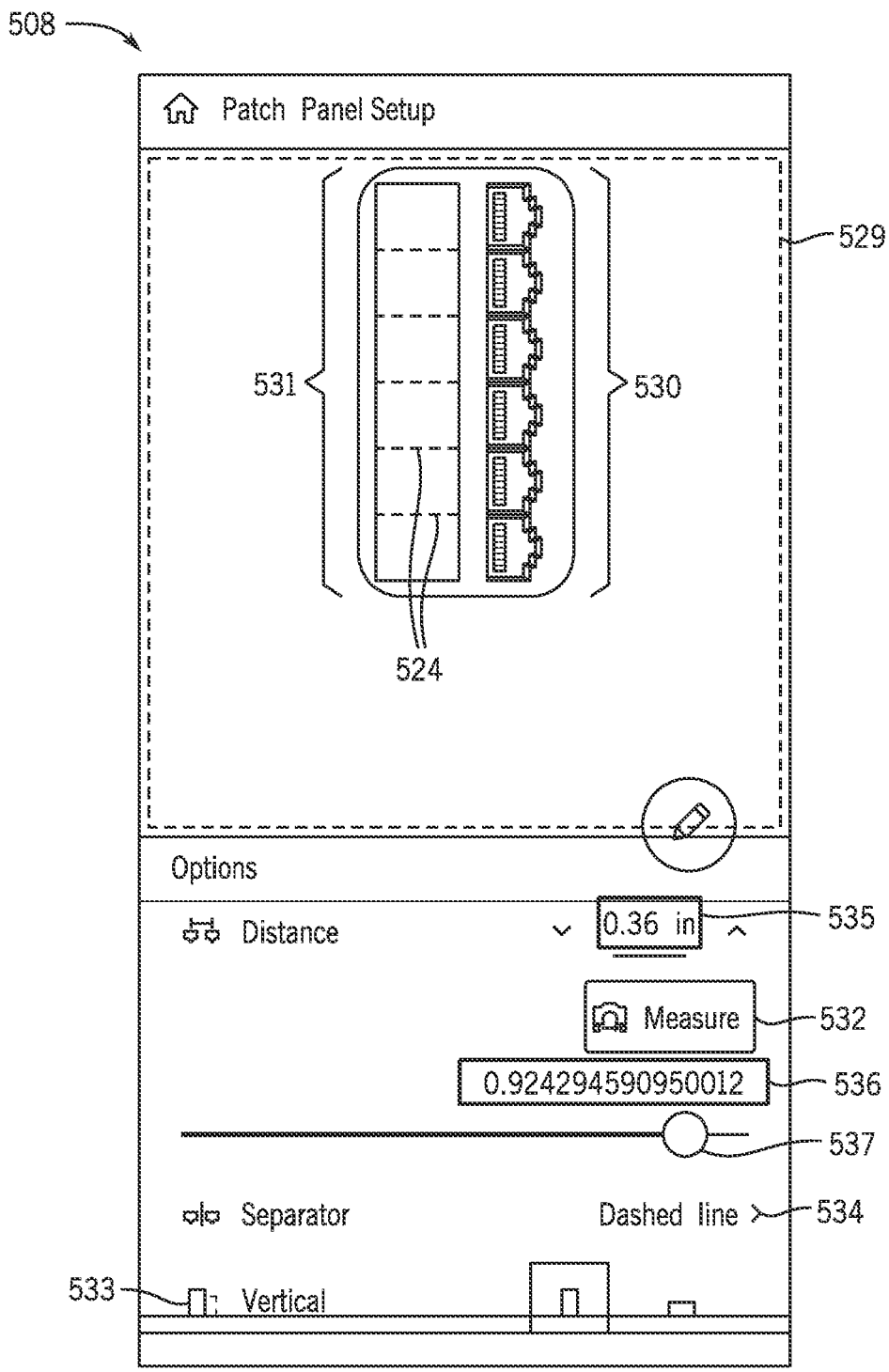
FIG. 5 illustrates an example of a user interface for a label printing module.

FIG. 5 illustrates aspects of a user interface 508 for the label printing module 107. The user interface 508 is one possible implementation of the user interface 108 in the system 100 shown in FIG. 1. The user interface 508 includes a section for displaying a preview of the label 104 that is being printed. This section of the user interface 508 may be referred to herein as a print preview section 529. In general terms, the print preview section 529 can include a visual representation of at least some portion of the object 101 for which a label 104 is being printed. For purposes of the present example, it will be assumed that a label 104 is being printed for the group 405a shown in FIG. 4B. Thus, the print preview section 529 of the user interface 508 includes a visual representation 530 of the group 405a. The print preview section 529 of the user interface 508 also includes a visual representation 531 of a printed label 404a to be affixed to the patch panel 401 near the group 405a. The visual representation 531 includes a plurality of markings 524 corresponding to the markings 424 on the printed label 404a.

The user interface 508 includes a plurality of user interface elements that enable a user to control and/or interact with one or more features of the label printing module 107. For example, the user interface 508 includes a button labeled 'Measure." This button may be referred to herein as the measure button 532. By clicking (or otherwise activating) the measure button 532, the user can cause the label printing module 107 to automatically measure the distance between two adjacent features 102 within the object 101 for which a label 104 is being printed. In the present example, clicking (or otherwise activating) the measure button 532 causes the label printing module 107 to automatically measure the distance between two adjacent ports 402 in the group 405a.

The user interface 508 also includes an icon 533 that indicates the orientation of the ports 402 in the group 405a. In the depicted example, the icon 533 indicates that the ports 402 in the group 405a have a vertical orientation. The visual representations 530, 531 in the print preview section 529 of the user interface 508 also depict the group 405a and the accompanying printed label 404a as having a vertical orientation.

In some embodiments, once the label printing module 107 detects the orientation of the features 102 (or a group 105 of features 102, such as a group 405a of ports 402) for which a label 104 is being printed, the icon 533 and/or the visual representations 530, 531 can be updated automatically. For example, if the icon 533 indicates that the orientation is horizontal but the label printing module 107 detects that the group 405a of ports 402 has a vertical orientation, then (i) the text that is displayed next to the icon 533 can be automatically changed from "horizontal" to "vertical," and (ii) the visual representations 530, 531 can be automatically changed from showing a group of ports having a horizontal orientation to showing a group of ports having a vertical orientation.

The user interface 508 also includes a button 534 that allows the user to change the type of marking 424 (e.g., dashed line, dotted line, solid line) that is included on the printed label 104. In some embodiments, one type of marking 424 (e.g., dashed line) is printed by default. The user can change the default selection by clicking (or otherwise activating) the button 534.

The user interface 508 also includes an indication 535 of the distance between two adjacent features 102 (e.g., the distance between the ports 402 in the group 405a), as automatically measured by the label printing module 107.

The user interface 508 also includes an indication 536 of the threshold for object detection. The user interface 508 also includes a slider 537 that allows the user to adjust the threshold that is represented by the indication 536. Instead of a slider 537, another type of user interface element could instead be used to give the user the opportunity to adjust the threshold. A user may adjust the threshold for object detection based on how much confidence the user has in the feature detection MLM 112 that is being utilized by the label printing module 107.

Figure 6:
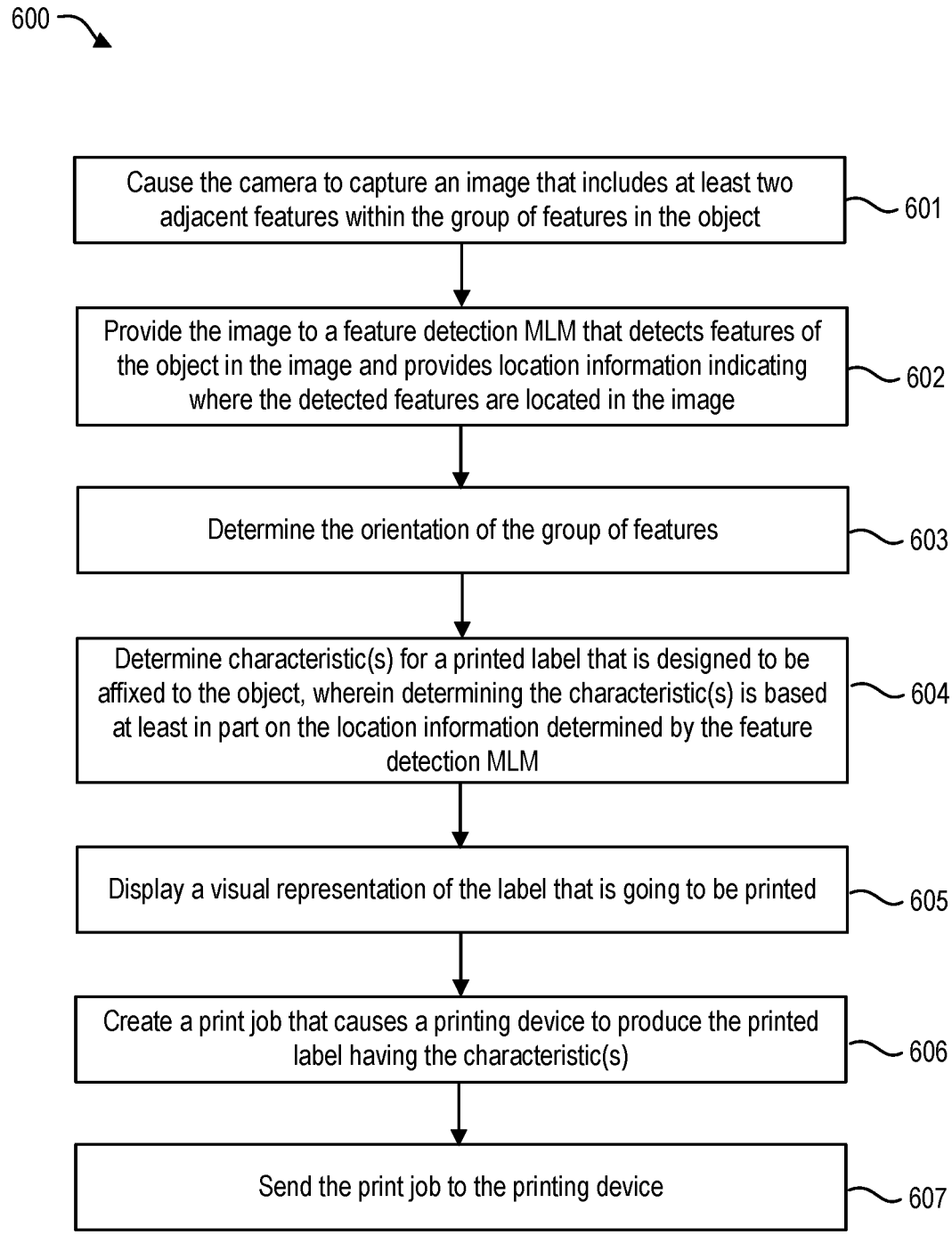
FIG. 6 illustrates an example of a method for simplifying label printing for an object that comprises a plurality of features.

FIG. 6 illustrates an example of a method 600 for simplifying label printing for an object 101 that comprises a plurality of features 102. The method 600 will be described in relation to the system 100 that is shown in FIG. 1. The method 600 can be implemented by the label printing module 107 that is running on the computing device 106. The method 600 can be performed when a user of the computing device 106 wants to print a label 104 for a group 105 of features 102 within an object 101 (e.g., a group 405 of ports 402 within a patch panel 401).

At 601, the label printing module 107 causes the camera 110 to capture an image 109 that includes at least two adjacent features 102 within the group 105 in the object 101. An example of such an image 109 is the image 309 shown in FIG. 3.

In some embodiments, act 601 can be performed in response to user input. For example, when a user wants to print a label 104 for a group 105 of features 102 within an object 101 (e.g., a group 405 of ports 402 within a patch panel 401), the user can click (or otherwise activate) the measure button 532 in the user interface 108 of the label printing module 107. In response to detecting that the user has clicked the measure button 532, the label printing module 107 can cause the camera 110 to become active (e.g., by sending a request to the operating system 119 to open the camera application 111) such that the camera feed is displayed on the display screen 120 of the computing device 106. The user can position the computing device 106 so that (at least) two adjacent features 102 in the group 105 are visible in the field of view of the camera 110. The user can then provide input to the computing device 106 requesting that an image 109 be captured. Such user input can be provided by clicking (or otherwise activating) one or more buttons within the camera application 111 and/or the label printing module 107. In response to this user input, the camera application 111 can cause the camera 110 to capture an image 109 of whatever is currently visible in the field of view of the camera 110.

At 602, the label printing module 107 provides the image 109 captured at 601 to the feature detection MLM 112. As discussed above, the feature detection MLM 112 has been trained to detect features 102 of an object 101 (e.g., ports 402 in a patch panel 401) in captured images 109. The feature detection MLM 112 processes the image 109 and detects the features 102 of the object 101 that are present in the image 109. The feature detection MLM 112 also provides location information 113 indicating whether the detected features 102 are located in the image 109. As discussed above, in some embodiments the location information 113 can include coordinates for bounding boxes (e.g., bounding boxes 325a-b) that define where in the image 109 the detected features 102 are located.

In some embodiments, the feature detection MLM 112 is running on the same computing device 106 as the label printing module 107. Thus, the label printing module 107 can provide the image 109 captured at 601 to the feature detection MLM 112 without connecting to the internet (or to any computer network). This can be useful if the user of the computing device 106 (e.g., an IT professional who is labeling a patch panel) does not have access to the internet, as discussed previously. If the computing device 106 is a mobile computing device, the feature detection MLM 112 running on the mobile computing device can be a compressed version of a larger feature detection MLM, as discussed above.

At 603, the label printing module 107 determines, based at least in part on the location information 113 determined by the feature detection MLM 112, the orientation (e.g., horizontal or vertical) of the group 105 for which the label is being printed. In the case of ports 402 within a patch panel 401, this can include determining whether the ports 402 are arranged side-by-side in a horizontal direction or are arranged vertically.

At 604, the label printing module 107 determines, based at least in part on the location information 113 determined by the feature detection MLM 112, one or more characteristics for the printed label 104. As a non-limiting example, the label printing module 107 can use the location information 113 (potentially in addition to other information as well) to determine the desired length of the printed label 104 and/or the placement of markings 424 on the printed label 104, as described above.

At 605, the label printing module 107 displays a visual representation 531 of the label 104 that is going to be printed. In some embodiments, the visual representation 531 can be displayed alongside a visual representation 530 of the group 105 of features 102 (e.g., the group 405 of ports 402) for which the label 104 is being printed.

In some embodiments, the orientation of the label 104 in the visual representation 531 matches the orientation of the group 105 detected at 603. In addition, the visual representation 531 of the label 104 can include the characteristic(s) determined at 604. In some embodiments, the visual representation 531 of the label 104 can be displayed in a print preview section 529 of a user interface 508 corresponding to the label printing module 107.

In some embodiments, once user input is received that causes act 601 to be performed, then acts 602 through 605 can be performed automatically without additional user input. Alternatively, in other embodiments, once user input is received that causes act 601 to be performed, then the remainder of the method 600 can be performed automatically without additional user input.

At 606, the label printing module 107 creates a print job 114 that causes a printing device 103 to produce the printed label 104 having the desired characteristic(s). Then, at 607, the label printing module 107 sends the print job 114 to the printing device 103. In some embodiments, acts 606 and 607 can be performed in response to user input.

Figure 7:
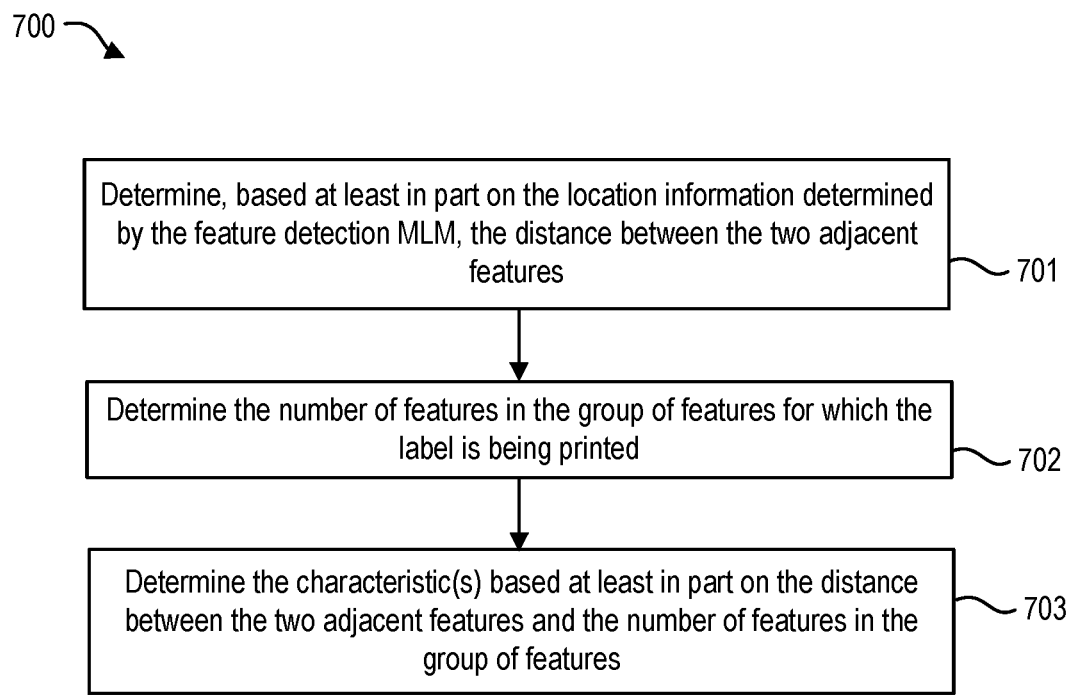
FIG. 7 illustrates an example of a method for determining characteristic(s) for a printed label based at least in part on location information determined by a feature detection MLM.

FIG. 7 illustrates an example of a method 700 for determining characteristic(s) for a printed label 104 based at least in part on the location information 113 determined by the feature detection MLM 112. In other words, the method 700 shown in FIG. 7 is an example showing how act 604 in the method 600 shown in FIG. 6 can be implemented. The method 700 will be described in relation to the system 100 that is shown in FIG. 1. The method 700 can be performed by the label printing module 107 that is running on the computing device 106.

As discussed above, the feature detection MLM 112 processes an image 109 that includes at least two adjacent features 102 of an object 101 (e.g., two adjacent ports 202a-b in a patch panel 201) for which a label 104 is being printed. The feature detection MLM 112 detects the features 102 of the object 101 that are present in the image 109 and provides location information 113 indicating where the detected features 102 are located in the image 109. At 701, the label printing module 107 determines, based at least in part on the location information 113 determined by the feature detection MLM 112, the distance between the two adjacent features 102. As discussed above, in some embodiments the distance between the two adjacent features 102 can be determined by calculating the distance between bounding boxes (e.g., bounding boxes 325a-b) that define where the adjacent features 102 are located in the image 109. The arrow 326 between the bounding boxes 325a-b shown in FIG. 3 is an example of the distance that can be calculated at 701.

As discussed above, the methods 600, 700 shown in FIGS. 6 and 7 can be performed when someone wants to print a label 104 for a group 105 within an object 101 (e.g., a group 405 of ports 402 within a patch panel 401). At 702, the label printing module 107 determines the number of features 102 in the group 105 (e.g., the number of ports 402 in the group 405) for which the label 104 is being printed. In some embodiments, the image 109 captured at 601 includes the entire group 105 for which the label 104 is being printed. In such embodiments, the feature detection MLM 112 can detect each feature 102 in the group 105, and act 702 can include counting the number of features 102 detected by the feature detection MLM 112. Alternatively, or in addition, the label printing module 107 can determine the number of features 102 in the group 105 via user input.

At 703, the label printing module 107 determines the characteristic(s) for the printed label 104 based at least in part on the distance between the two adjacent features 102 (as determined at 701) and the number of features 102 in the group 105 (as determined at 702). As a non-limiting example, the characteristic(s) determined at 703 can include the desired length of the printed label 104. In some embodiments, the desired length of the printed label 104 can be determined as (N−W)+(N−1)*D, where N represents the number of features 102 in the group 105 (as determined at 702), W represents the width of each feature 102 (which can be known in advance, as will be discussed below), and D represents the distance between two adjacent features 102 (as determined at 701).

In some embodiments, the width of each feature 102 can be a standard value, and the label printing module 107 can be programmed such that this value is known to the label printing module 107. For example, in the case of patch panels 201, the width of a certain type of port 202 (e.g., an Ethernet port) is a standard value and can be known to the label printing module 107.

As another non-limiting example, the characteristic(s) determined at 604 can include the placement of markings (such as the markings 224, 424 described previously) on the printed label 104. In some embodiments where the printed label 104 has a horizontal orientation, the placement of the $i^{th}$ marking from the left side of the printed label 104 can be determined as (i*W)+(i−1)*D+(D/2), where i represents any positive integer, and the values of W and D are as indicated above. Thus, the first marking from the left side of the printed label 104 (e.g., marking 224a in the printed label 204a shown in FIG. 2B) can be determined as W+(D/2), the second marking from the left side of the printed label 104 (e.g., marking 224b in the printed label 204a shown in FIG. 2B) can be determined as 2W+D+(D/2), the third marking from the left side of the printed label 104 (e.g., marking 224c in the printed label 204a shown in FIG. 2B) can be determined as 3 W+2D+(D/2), and so forth.

Figure 8:
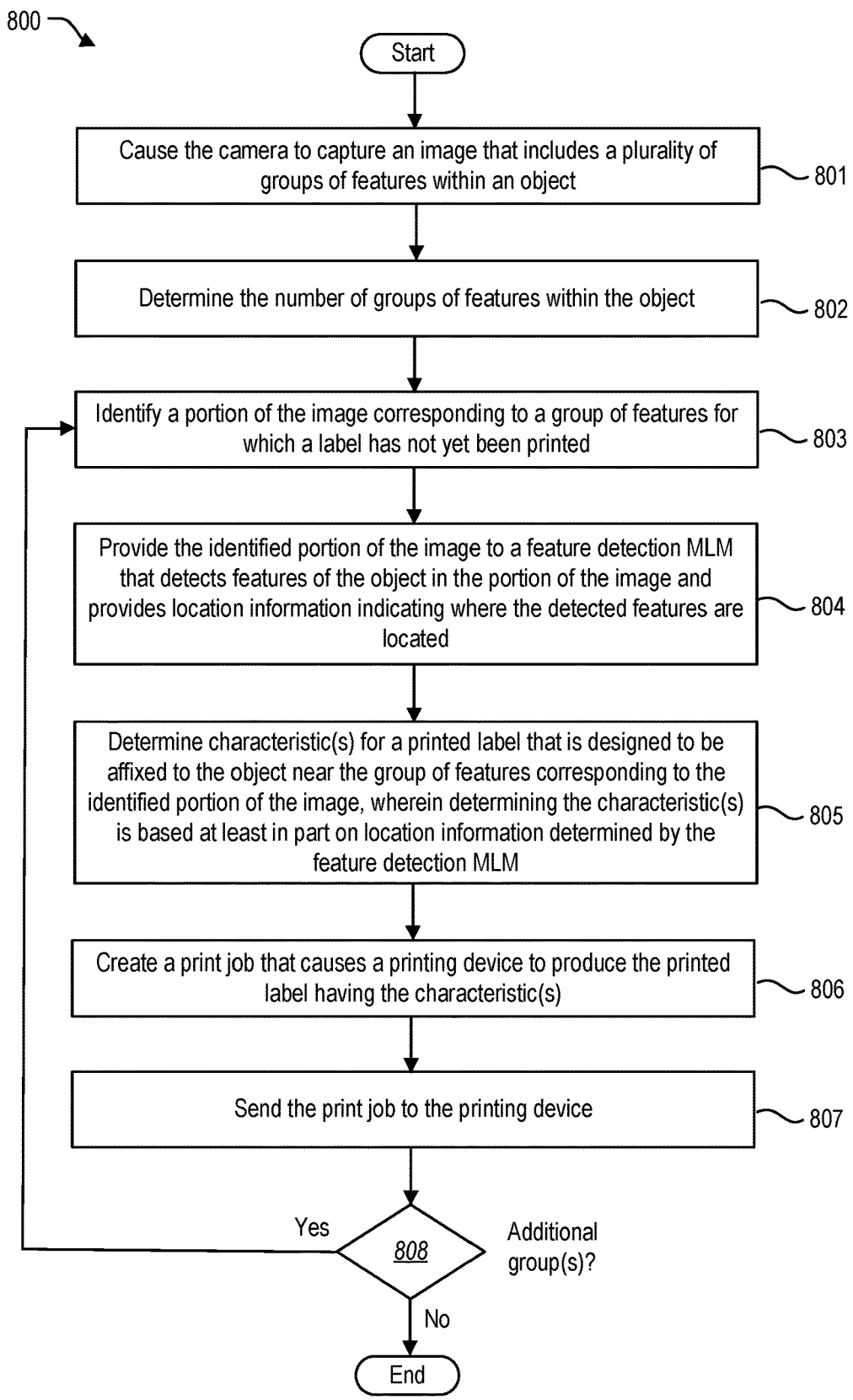
FIG. 8 illustrates an example of a method for automatically printing a distinct label for each of a plurality of groups of features within an object.

As discussed above, in some embodiments, an object 101 can include a plurality of groups 105 of features 102 (e.g., groups 205a-f, 405a-b, as in the patch panels 201, 401 shown in FIGS. 2A and 4A). In such embodiments, the label printing module 107 can be used to automatically print a distinct label 104 for each group. FIG. 8 illustrates an example of a method 800 showing how this can occur. The method 800 will be described in relation to the system 100 that is shown in FIG. 1. The method 800 can be implemented by the label printing module 107 that is running on the computing device 106.

At 801, the label printing module 107 causes the camera 110 to capture an image 109 that includes a plurality of groups 105 of features 102 within an object 101. As an example, the camera 110 could capture an image 109 of the plurality of groups 205a-f of ports 202 in the patch panel 201 shown in FIG. 2A. In some embodiments, act 801 can be performed in response to user input (similar to act 601 in the method 600 shown in FIG. 6).

At 802, the label printing module 107 determines the number of groups 105 of features 102 within the object 101. There are several different ways that this determination can be made. As a non-limiting example, the image 109 captured at 801 can be provided to and processed by the feature detection MLM 112. The output of the feature detection MLM 112 can then be provided to the clustering module 115, which can execute a clustering algorithm on the output of the feature detection MLM 112. As another non-limiting example, the image 109 captured at 801 can be provided to and processed by the group detection MLM 116, which has been trained to detect groups 105.

At 803, the label printing module 107 identifies a portion of the image 109 captured at 801 that corresponds to a group 105 for which a label 104 has not yet been printed. At 804, the label printing module 107 provides the portion of the image 109 identified at 803 to the feature detection MLM 112. In some embodiments, the label printing module 107 provides only the portion of the image 109 identified at 803 to the feature detection MLM 112. Alternatively, in other embodiments, the label printing module 107 provides the entire image 109 captured at 801 to the feature detection MLM 112 along with an indication about which portion of the image 109 should be processed.

The feature detection MLM 112 processes the portion of the image 109 that it receives at 804 in a manner that is similar to what was described above in connection with the method 600 shown in FIG. 6. In particular, the feature detection MLM 112 detects features 102 of the object 101 in the portion of the image 109 and provides location information 113 indicating where the detected features 102 are located. At 805, the label printing module 107 determines characteristic(s) for a printed label 104 that is designed to be affixed to the object 101 near the group 105 of features 102 corresponding to the identified portion of the image 109. Thus, act 805 is similar to act 604 in the method 600 shown in FIG. 6.

In some embodiments, the label printing module 107 can also determine the orientation of the group 105 of features 102 (similar to act 603 in the method 600 shown in FIG. 6) and/or display a visual representation 531 of the label 104 that is going to be printed (similar to act 605 in the method 600 shown in FIG. 6).

At 806 the label printing module 107 creates a print job 114 that causes a printing device 103 to produce the printed label 104 having the desired characteristic(s). Then, at 807, the label printing module 107 sends the print job 114 to the printing device 103.

At 808, the label printing module 107 determines whether there are any additional groups 105 of features 102 for which a label 104 has not yet been printed. If there are, then the method 800 returns to 803 and proceeds as described above. On the other hand, if it is determined that labels 104 have been printed for all of the groups 105 of features 102 in the object 101, then the method 800 ends.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" refers to any device or system that manipulates, interprets, or transforms data, typically executing a set of instructions stored in memory. The term "processor" encompasses a variety of devices including, but not limited to, general-purpose processors, central processing units (CPUs), graphics processing units (GPUs), microprocessors, digital signal processors (DSPs), controllers, microcontrollers, and state machines. In some circumstances, the term "processor" may extend to application specific integrated circuits (ASICs), programmable logic devices (PLDs), and field programmable gate arrays (FPGAs). Furthermore, the term "processor" can refer to a configuration involving multiple processing devices working in concert, such as a combination of a DSP and a microprocessor, multiple microprocessors, or one or more microprocessors combined with a DSP core.

The term "memory" refers to any electronic component or system capable of storing digital information, either temporarily or permanently. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, and so forth. Memory is said to be communicatively coupled to a processor if the processor can read information from and/or write information to the memory. Memory that is integral to a processor is communicatively coupled to the processor.

The term "module" refers to any set of instructions that can be executed by a processor to perform one or more functions. A module can be implemented in a variety of different ways. In some embodiments, a module can be a standalone software application or program. In other embodiments, a module can be implemented as a portion of a software application or program. For example, a module can be implemented as one or more instructions (e.g., routines, sub-routines, functions, procedures) within a software application or program. In other embodiments, a module can be code (e.g., a JavaScript file) executed by a web browser to interact with a server-based application or program. Other possible examples of a module include a static or dynamic library that provides a set of related functionalities; an extension or plugin that adds or enhances the features of an existing software program; a package or a group of related classes or functions; and/or an application programming interface (API) endpoint. In some embodiments, a module can be considered to be a purely software component. Alternatively, in other embodiments, at least some aspects of a module can be implemented, either wholly or partially, within the firmware of a computing device. Those skilled in the art will recognize many additional ways that a module can be implemented.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Any communication interface(s) described herein can be based on wireless communication technology and/or wired communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port. Some examples of communication interfaces that are based on wired communication technology include a Universal Serial Bus (USB) and an Ethernet adapter.

The term "display screen" can refer to a component that provides an interface for users to interact with a computing device and view output data in a visual form. Some examples of display screen technologies that can be utilized in connection with the techniques disclosed herein include liquid crystal display (LCD) technology, organic light emitting diode (OLED) technology, active matrix OLED (AMOLED) technology, electronic ink (e-ink) technology, microscopic light emitting diode (microLED) technology, and so forth. Those skilled in the art will recognize many additional types of display screen technologies that can be utilized in connection with the techniques disclosed herein.

The term "operating system" can refer to software that manages or controls the overall operation of a computing device by performing tasks such as managing hardware resources, running applications, enforcing security and access control, managing files, and/or providing a user interface.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The term "automatically" can refer to the performance of specific acts or operations without requiring direct input or explicit instructions from a user for each instance of operation. In the context of a software component, automatic actions or operations can be based on predefined algorithms, rules, or machine learning models embedded within the software. Automatic operations can include event-driven operations, time-based operations, operations responsive to certain state changes in the system, or operations dictated by heuristic processes. The degree of automation can vary. Some processes may be fully automatic, requiring no human intervention post-setup, while others may be semi-automatic, requiring human input or confirmation at certain stages or under specific circumstances. The term "automatically" does not necessarily mean that the operations occur without any initiation. Rather, there could be an initiating action such as the launching of the software, the beginning of a session, or a specific command given by the user or another software component. Once initiated, the "automatic" operations can continue as defined without requiring additional user input.

In general, the term "substantially" should be interpreted to mean "to a great extent or degree." The term "substantially" denotes that something is mostly or for the most part as specified but may not be in all details or aspects.

Two objects are considered to have "substantially similar" lengths if their lengths are within a small percentage difference of each other, indicating that their measurements are close enough to be considered nearly equivalent. In some embodiments, two objects are considered to have "substantially similar" lengths if their lengths are within 0.1% of each other. In other embodiments, two objects are considered to have "substantially similar" lengths if their lengths are within 1% of each other. In other embodiments, two objects are considered to have "substantially similar" lengths if their lengths are within 5% of each other.

The term "substantially horizontal" means that something is mostly or significantly horizontal, although it may not be perfectly so. In some embodiments, something is "substantially horizontal" if its deviation from perfect horizontality is less than or equal to 0.1 degrees. In other embodiments, something is "substantially horizontal" if its deviation from perfect horizontality is less than or equal to 1 degree. In other embodiments, something is "substantially horizontal" if its deviation from perfect horizontality is less than or equal to 5 degrees.

The term "substantially vertical" means that something is mostly or significantly vertical, although it may not be perfectly so. In some embodiments, something is "substantially vertical" if its deviation from perfect verticality is less than or equal to 0.1 degrees. In other embodiments, something is "substantially vertical" if its deviation from perfect verticality is less than or equal to 1 degree. In other embodiments, something is "substantially vertical" if its deviation from perfect verticality is less than or equal to 5 degrees.

Two objects or paths can be considered to be "substantially parallel" if they deviate from being exactly parallel by such a small degree that they can be functionally considered parallel for practical purposes. In some embodiments, two objects or paths can be considered to be "substantially parallel" if they deviate from being exactly parallel by less than or equal to 0.1 degrees. In other embodiments, two objects or paths can be considered to be "substantially parallel" if they deviate from being exactly parallel by less than or equal to 1 degree. In other embodiments, two objects or paths can be considered to be "substantially parallel" if they deviate from being exactly parallel by less than or equal to 5 degrees.

Two objects or paths can be considered to be "substantially perpendicular" if they deviate from being exactly perpendicular by such a small degree that they can be functionally considered perpendicular for practical purposes. In some embodiments, two objects or paths can be considered to be "substantially perpendicular" if they deviate from being exactly perpendicular by less than or equal to 0.1 degrees. In other embodiments, two objects or paths can be considered to be "substantially perpendicular" if they deviate from being exactly perpendicular by less than or equal to 1 degree. In other embodiments, two objects or paths can be considered to be "substantially perpendicular" if they deviate from being exactly perpendicular by less than or equal to 5 degrees.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system that is configured to print one or more labels for an object that comprises a group of features, the system comprising:
    a camera;
    a processor;
    memory communicatively coupled to the processor; and
    a label printing module that is stored in the memory and executable by the processor to:
        cause the camera to capture an image that comprises at least two adjacent features within the group of features;
        provide the image to a feature detection machine learning model (MLM) that has been trained to detect features of the object in images, wherein the feature detection MLM detects the two adjacent features of the object in the image and determines location information indicating where the two adjacent features are located in the image;
        determine, based at least in part on the location information, the distance between the two adjacent features;
        determine the number of features in the group of features;
        determine at least one characteristic for a printed label corresponding to the group of features based at least in part on the distance between the two adjacent features and the number of features in the group of features;
        create a print job that causes a printing device to produce the printed label having the at least one characteristic; and
        send the print job to the printing device.

2. The system of claim 1, wherein:
    the object comprises a patch panel; and
    the image comprises a plurality of ports within the patch panel.

3. The system of claim 1, wherein:
    causing the camera to capture the image is performed in response to user input; and
    the actions of providing the image to the feature detection MLM and determining the at least one characteristic for the printed label are performed automatically without any additional user input.

4. The system of claim 1, wherein determining the distance between the two adjacent features comprises calculating the distance between bounding boxes that define where the adjacent features are located in the image.

5. The system of claim 1, wherein the at least one characteristic comprises a length of the printed label.

6. The system of claim 1, wherein the at least one characteristic comprises a plurality of markings that indicate boundaries between adjacent features within the group of features.

7. The system of claim 1, wherein determining the number of features in the group of features comprises receiving user input that indicates the number of features in the group of features.

8. The system of claim 1, wherein:
    the image comprises all of the features within the group of features;
    the feature detection MLM detects each feature within the group of features; and
    determining the number of features in the group of features comprises counting the number of features detected by the feature detection MLM.

9. The system of claim 1, wherein the label printing module is additionally executable by the processor to automatically determine an orientation of the group of features within the object.

10. The system of claim 9, wherein:
    the label printing module is additionally executable by the processor to display a visual representation of the printed label;
    the visual representation of the printed label has an orientation that matches the orientation of the group of features; and
    the visual representation of the printed label comprises an indication of the at least one characteristic for the printed label.

11. The system of claim 1, wherein the location information comprises coordinates for bounding boxes that define where in the image the features detected by the feature detection MLM are located.

12. The system of claim 1, wherein:
the system comprises a mobile computing device;
the feature detection MLM runs on the mobile computing device; and
the feature detection MLM is a compressed version of a larger feature detection MLM.

13. The system of claim 1, wherein the object comprises a plurality of groups of features, wherein the image comprises the plurality of groups of features within the object, and wherein the label printing module is additionally executable by the at least one processor to:
automatically determine the number of groups of features in the object; and
automatically create a separate print job for each group of features in the object.

14. The system of claim 13, wherein determining the number of groups of features in the object comprises executing a clustering algorithm on the output of the feature detection MLM.

15. The system of claim 13, wherein determining the number of groups of features in the object comprises providing the image to a group detection MLM that has been trained to detect groups of features.

16. A method for printing a label for a group of features in an object, the method comprising:
causing a camera to capture an image that comprises at least two adjacent features within the group of features;
providing the image to a feature detection machine learning model (MLM) that has been trained to detect features of the object in images, wherein the feature detection MLM detects the two adjacent features of the object in the image and determines location information indicating where the two adjacent features are located in the image;
determining, based at least in part on the location information, the distance between the two adjacent features;
determining the number of features in the group of features;
determining at least one characteristic for the label based at least in part on the distance between the two adjacent features and the number of features in the group of features;
creating a print job that causes a printing device to produce the label having the at least one characteristic; and
sending the print job to the printing device.

17. The method of claim 16, wherein:
the object comprises a patch panel; and
the image comprises a plurality of ports within the patch panel.

18. A non-transitory computer-readable medium comprising instructions that are executable by at least one processor to cause a computing device to:
cause a camera to capture an image that comprises at least two adjacent features within a group of features in an object;
provide the image to a feature detection machine learning model (MLM) that has been trained to detect features of the object in images, wherein the feature detection MLM detects the two adjacent features of the object in the image and determines location information indicating where the two adjacent features are located in the image;
determine, based at least in part on the location information, the distance between the two adjacent features;
determine the number of features in the group of features;
determine at least one characteristic for a printed label that is designed to be affixed to the object, wherein determining the at least one characteristic is based at least in part on the distance between the two adjacent features and the number of features in the group of features;
create a print job that causes a printing device to produce the printed label having the at least one characteristic; and
send the print job to the printing device.

19. The non-transitory computer-readable medium of claim 18, wherein:
causing the camera to capture the image is performed in response to user input; and
the actions of providing the image to the feature detection MLM and determining the at least one characteristic for the printed label are performed automatically without any additional user input.

20. The non-transitory computer-readable medium of claim 18, wherein the at least one characteristic comprises a length of the printed label.

* * * * *